March 16, 1971     R. E. WATSON     3,570,021
TOP-INSTALLABLE TOILET SEAT HINGE POST
Filed March 20, 1969
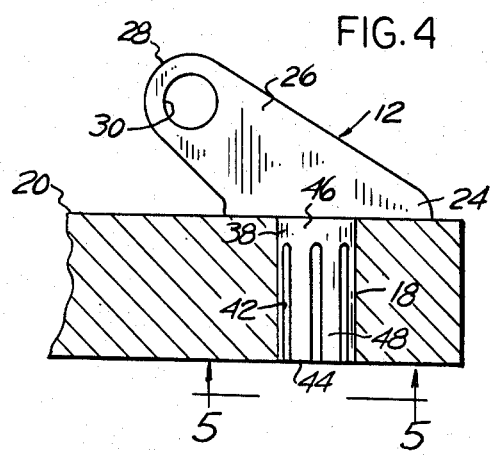
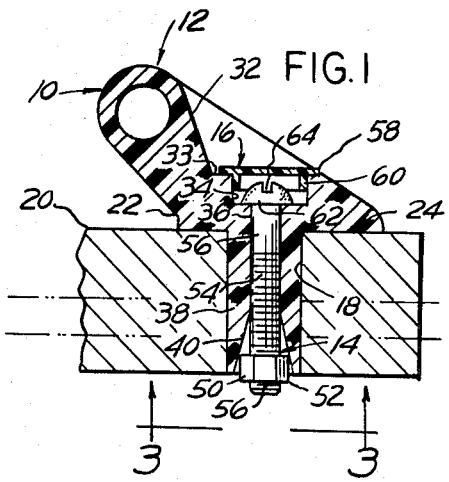
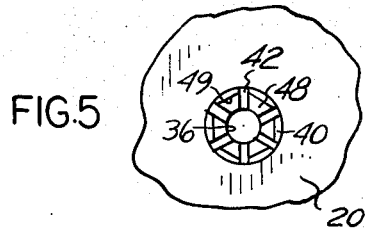
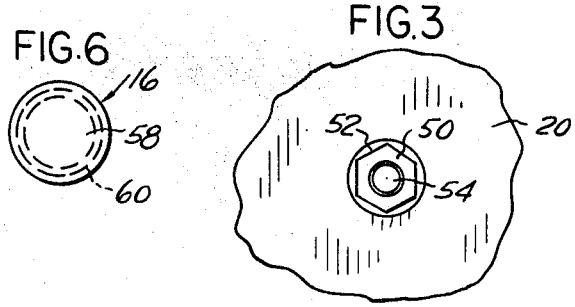
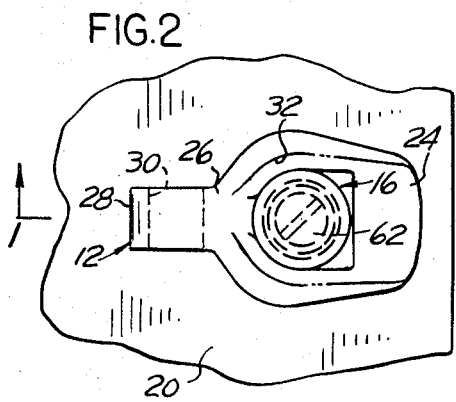
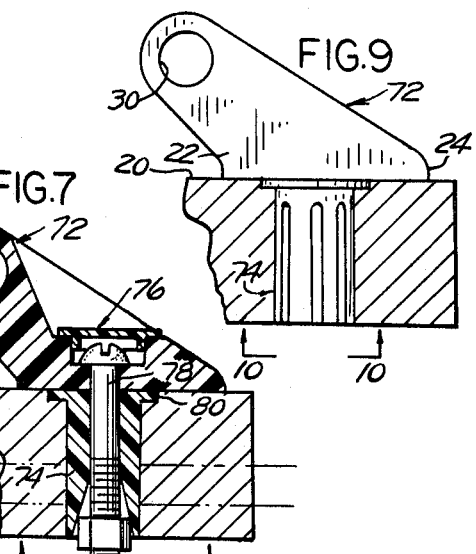
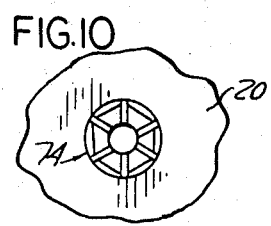
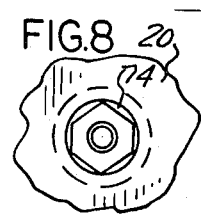
INVENTOR
ROBERT E. WATSON
BY *Barthel & Bugbee*
ATTORNEYS 3,570,021
Patented Mar. 16, 1971

3,570,021
TOP-INSTALLABLE TOILET SEAT HINGE POST
Robert E. Watson, Farmington, Mich., assignor to Swedish
   Crucible Steel Company, Detroit, Mich.
Filed Mar. 20, 1969, Ser. No. 808,805
Int. Cl. A47k *13/12*
U.S. Cl. 4—240                                           2 Claims

ABSTRACT OF THE DISCLOSURE

This toilet seat hinge post has a base adapted to rest upon the toilet bowl rear platform and a longitudinally-slotted hollow stem adapted to extend down into one of the platform stud holes thereof. The central bore in the stem extends from a countersink in the top of the base to a tapered or flared counterbore of polygonal cross-section at the lower end of the stem. The screw of an expanding bolt having its head inserted in the countersink extends downward through the central bore and has its nut, also of polygonal cross-section threaded upon its lower end within the tapered counterbore and is thereby prevented from rotating when the screw is rotated. A hinge post ear rises from the base for receiving the hinge rod of the toilet seat or cover. The hinge post is installed by dropping the stem into the stud hole after which the screw of the bolt is tightened, causing the nut thereon to travel upward into the tapered counterbore and expand the circumferentially-spaced fingers formed by the longitudinal slots of the stem into tight gripping engagement with the side wall of the stud hole. A removable flanged cap is then inserted in the countersink to conceal the head of the screw. To remove the hinge post, the foregoing procedure is reversed.

ADVANTAGES OF THE INVENTION

The above-described hinge post construction and the consequent expansibility of the slotted stem enables it to fit varying sizes of stud holes. The control of its expansion from above enables its insertion and removal from above, and eliminates the necessity of inserting and manipulating a wrench in the limited and often inaccessible space beneath the toilet bowl platform. Access to the nut is not required because its edges engage the sides of the stem counterbore and are locked against rotation thereby. Furthermore, when the bolt of the hinge post is tightened, the slotted stem expands sufficiently to lock it securely in place upon the toilet bowl platforms of the widely differing thicknesses occurring in the plumbing industry, as shown by the horizontal chain lines in FIGS. 1 and 7.

In the drawings:

FIG. 1 is a central vertical section through a top-installable toilet seat hinge post, according to one form of the invention, taken along the line 1—1 in FIG. 2;

FIG. 2 is a top plan view of the hinge post shown in FIG. 1;

FIG. 3 is a bottom plan view, looking in the direction of the arrows 3—3 in FIG. 1;

FIG. 4 is a side elevation of the hinge post bracket inserted in the stud hole of the toilet bowl platform, with the expanding bolt omitted to show the construction more clearly, and with the toilet bowl platform in section;

FIG. 5 is a bottom plan view of the hinge post bracket looking in the direction of the arrows 5—5 in FIG. 4;

FIG. 6 is a top plan view of the countersink closure cap shown in cross-section in FIG. 1;

FIG. 7 is a central vertical section through a modified top-installable toilet seat hinge post;

FIG. 8 is a bottom plan view looking in the direction of the arrows 8—8 in FIG. 7;

FIG. 9 is a side elevation of the modified hinge post bracket inserted in the stud hole of the toilet bowl platform, with the expanding bolt also omitted, and with the toilet bowl platform in section; and FIG. 10 is a bottom plan view of the modified hinge post bracket looking in the direction of the arrows 10—10 in FIG. 9.

Referring to the drawing in general, FIGS. 1 to 6 inclusive show a top-installable toilet seat hinge post, generally designated 10, as consisting generally of a hinge post bracket 12, a bracket-expanding bolt 14, and a countersink closure cap 16, all as installed in a stud hole 18 in the rear platform 20 of a conventional toilet bowl (not shown). The toilet bowl 22 and its platform 20 are conventional and their details are beyond the scope of the present invention. It will be understood by those skilled in this art, however, that the stud holes 18, of which there are ordinarily two in a conventional toilet bowl platform 20, vary somewhat in diameter due to unavoidable variations arising during manufacture.

The present hinge post 10 not only adapts itself to such variations in manufacture but is top-installable, i.e. from above the platform 20, and therefore does not require access to the limited and often inaccessible space below the platform 20 for the insertion and manipulation of a wrench, pliers or other tools used in installing or removing the hinge post 10. It will be further understood that the ordinary toilet seat, with or without a cover or lid, ordinarily employs two hinge posts but as these are ordinarily duplicates of one another except for a possible right-hand and left-hand construction, a single illustration and description will suffice for both such hinge posts.

Referring to the drawing in detail, the hinge post bracket 12 includes a bracket body 22 with a base portion 24 from which rises an upstanding ear portion comprising a hinge pintle support 26, either in an upward or upwardly-inclined direction, and terminating at its upper end 28 in a hinge pintle or hinge rod bore or socket 30. On this hinge rod or pintle (not shown) are pivotally mounted a pair of hinge brackets for the toilet seat or ring, together with a pair of hinge brackets for the lid or cover, where such is installed.

The ear portion 26 on its upper side is provided with a flat-bottomed recess 32 (FIG. 1) from which a countersink 34 and a bore 36 extend downward, the latter concentric with a stem 38 and terminating at its lower end in an upwardly-tapered or downwardly-flared counterbore 40. The stem 38 is provided with circumferentially-spaced slots 42 (FIG. 4) extending downwardly from slightly below the base portion 24 to the lower end 44 of the stem 38, these slots 42 extending radially inward from the outer cylindrical surface 46 of the stem 38 to the bore 36 and counterbore 40 (FIG. 5) so as to form multiple circumferentially spaced fingers 48. The counterbore 40 will be seen from FIG. 5 to be of polygonal cross-section, in this particular instance with six flat sides 49 to fit the edge of the corresponding six flat sides 50 (FIG. 3) of a nut 52 threaded upon the lower end of the threaded shank 54 of the screw 56 which with the nut 52 (FIG. 1) collectively form the expanding bolt 14. The countersink closure cap 16 (FIGS. 1 and 6) is in the shape of a flanged disc with a circular top wall 58 which extends radially outward beyond a shallow cylindrical depending flange 60 to snugly fit and conceal the countersink 34 as well as the screw head 62, which has a transverse slot 64 therein.

The modified top-installable and removable toilet seat hinge post, generally designated 70, which in FIGS. 7 to 10 inclusive, consists generally of a hinge post bracket 72 separate and distinct from a flanged stem 74, a countersink closure cap 76 and an expanding bolt 78. The top of the stem 74 is provided with a radial flange 80 thereon. The remainder of the construction of the modified hinge post is similar to that of the hinge post 10 shown in FIGS.

1 to 6 inclusive, hence similar parts are designated with the same reference numerals.

In the installation of the hinge post 10 in a stud hole 18 of a toilet bowl platform 20, the operator removes the closure cap 16 by prying it upward from the flat bottom 33 of the recess 32 so as to expose the head 62 of the screw 56 of the bolt 14. With a screw-rotating tool, such as a screw driver, inserted in the slot of the head 62 of the screw 56 he rotates the latter counterclockwise to move the nut 52 downward as far as possible along the threaded shank 54 without moving it out of the tapered counterbore 40, so as to be sure that the fingers 48 are in their innermost positions. The operator then pushes the stem 38 downward into the stud hole 48 and, having oriented the hinge post bracket 12 in its proper direction, again inserts the screw driver in the slot of the screw head 62 and rotates the screw 56 in a clockwise direction. This action causes the nut 52 to travel upward along the threaded shank 54 while the edges of its sides 50 engage the counterbore sides 40 to prevent relative rotation therebetween and, because of the tapered directions of the sides 40 (FIG. 1), forces the fingers 48 outward against the wall of the stud bore 18, locking the hinge post 10 firmly in position. The closure cap 16 is then pressed into the countersink 34 to conceal the screw head 62. For this purpose, the closure cap 16 is preferably made of resilient synthetic plastic material. The hinge post bracket 12 is also preferably and conveniently formed from synthetic plastic material. The hinge post 10 is removed by reversing the procedure just described.

The modified hinge post 70 is installed and removed in a similar manner to that described above for the hinge post 10, hence a repetition of the steps of installation and removal is believed unnecessary.

While the screw 56 of the expanding bolt 14 is illustrated as having a head 62 with a diametral slot 64 therein for receiving an ordinary screw driver, it will be understood that other types of fasteners with different means thereon for receiving a rotating tool may also be used, for example, the screw 56 may be of the so-called Allen screw type with a head containing a hexagonal socket. Alternatively, the head 62 may be provided with a cross-shaped slot of the so-called Phillips screw type. Furthermore, different shapes of nuts may be used other than the hexagonal nut.

The hinge post 10 is conveniently made of polypropylene or polyethylene plastic whose tough, rubbery characteristics resist fracture or tearing when subjected to deformation.

I claim:
1. A top-installable toilet seat hinge post adapted for installation in a stud hole in the rear platform of a conventional toilet bowl, said hinge comprising
   a hinge post bracket having a bracket body including a base portion with a hinge pintle support extending upward therefrom and an elongated stem portion extending downward therefrom and configured to approximately fit the platform stud hole,
     said stem portion having a longitudinal bore therethrough and a downwardly-flared counterbore of polygonal cross-section disposed in the lower end portion of said stem portion in communication with said bore,
     said stem portion having a multiplicity of elongated circumferentially-spaced slots therein extending therethrough from the exterior thereof to said bore and defining a multiplicity of circumferentially-spaced fingers disposed between said slots,
   a screw-threaded fastener rotatably mounted in said bore with a rotating-tool-receiving head at the upper end thereof, and
   a threaded nut of polygonal cross-section fixedly disposed in said flared counterbore in relative rotation-preventing relationship therewith and threadedly engaging said fastener.
2. A top-installable toilet seat hinge post, according to claim 1, wherein said nut and said flared counterbore are of corresponding polygonal cross-section and have substantially flat sides engaging one another in said relative rotation-preventing relationship.

References Cited

UNITED STATES PATENTS

| 1,031,462 | 7/1912 | Paine | 85—73 |
| 2,296,470 | 9/1942 | Keehn | 85—75 |
| 3,017,800 | 1/1962 | Cohen | 85—70 |
| 3,301,121 | 1/1967 | Newcomer | 4—240 |
| 3,377,633 | 4/1968 | Waldon | 85—53 |
| 3,449,774 | 6/1969 | Wilham | 85—70 |

FOREIGN PATENTS

| 758,349 | 5/1967 | Canada | 85—76 |
| 906,615 | 9/1962 | Great Britain | 85—75 |

HOUSTON S. BELL, JR., Primary Examiner

U.S. Cl. X.R.

85—75